US012789278B2

(12) United States Patent
Söllinger

(10) Patent No.: US 12,789,278 B2
(45) Date of Patent: Nov. 10, 2026

(54) MULTIPLE WELDING METHOD

(71) Applicant: Fronius International GmbH, Pettenbach (AT)

(72) Inventor: Dominik Söllinger, Wels-Thalheim (AT)

(73) Assignee: Fronius International GmbH, Pettenbach (AT)

( * ) Notice: Subject to any disclaimer, the term of this patent is extended or adjusted under 35 U.S.C. 154(b) by 692 days.

(21) Appl. No.: 18/266,161

(22) PCT Filed: Dec. 15, 2021

(86) PCT No.: PCT/EP2021/085815
§ 371 (c)(1),
(2) Date: Jun. 8, 2023

(87) PCT Pub. No.: WO2022/129122
PCT Pub. Date: Jun. 23, 2022

(65) Prior Publication Data

US 2024/0033842 A1 Feb. 1, 2024

(30) Foreign Application Priority Data

Dec. 17, 2020 (EP) .................................... 20214930

(51) Int. Cl.
*B23K 9/09* (2006.01)
*B23K 9/095* (2006.01)
(Continued)

(52) U.S. Cl.
CPC .............. *B23K 9/093* (2013.01); *B23K 9/095* (2013.01); *B23K 9/1735* (2013.01); *B23K 9/125* (2013.01)

(58) Field of Classification Search
CPC ...... B23K 9/095; B23K 9/1735; B23K 9/093; B23K 9/09; B23K 9/125
See application file for complete search history.

(56) References Cited

U.S. PATENT DOCUMENTS 4,809,735 A 3/1989 Volgstadt et al.
8,124,913 B2 2/2012 Artelsmair
(Continued)

FOREIGN PATENT DOCUMENTS

DE 11 2014 001 441 1/2016
EP 2546017 1/2013
(Continued)

OTHER PUBLICATIONS

Int'l Search Report (Form PCT/ISA/210) conducted in Int'l Appln. No. PCT/EP2021/085815 (May 12, 2022).
(Continued)

*Primary Examiner* — Thien S Tran
(74) *Attorney, Agent, or Firm* — GREENBLUM & BERNSTEIN, P.L.C.

(57) ABSTRACT

A multiple welding method using at least two consumable electrodes which enables stable welding processes at the electrodes and also less heat input into the parent material compared with the multiple pulse welding method. At each of the at least two electrodes a welding process includes a short-circuit welding phase and a hot-welding phase with higher heat input into the parent material relative to the short-circuit welding phase, the short-circuit welding phase and the hot-welding phase periodically alternating, and for the short-circuit welding phases of the welding processes of the at least two electrodes to be temporally synchronized on the basis of at least one defined first synchronization event per short-circuit welding phase.

20 Claims, 5 Drawing Sheets

(51) Int. Cl.

| | |
|---|---|
| ***B23K 9/12*** | (2006.01) |
| ***B23K 9/173*** | (2006.01) |

(56) References Cited

U.S. PATENT DOCUMENTS

| | | | | |
|---|---|---|---|---|
| 8,946,596 | B2 | 2/2015 | Peters | |
| 2004/0222204 | A1 | 11/2004 | Hutchinson | |
| 2007/0056944 | A1* | 3/2007 | Artelsmair | B23K 9/092 219/130.5 |
| 2007/0145028 | A1 | 6/2007 | Artelsmair | |
| 2011/0248007 | A1 | 10/2011 | Takeda et al. | |
| 2014/0263234 | A1 | 9/2014 | Peters et al. | |
| 2015/0343549 | A1* | 12/2015 | Henry | B23K 9/1735 219/130.51 |
| 2022/0055137 | A1 | 2/2022 | Söllinger et al. | |

FOREIGN PATENT DOCUMENTS

| | | |
|---|---|---|
| EP | 1 677 940 | 11/2013 |
| EP | 3 674 027 | 7/2020 |
| JP | S59-070469 | 4/1984 |
| JP | 2004-223550 | 8/2004 |
| JP | 2007-508939 | 4/2007 |
| JP | 2007-513779 | 5/2007 |
| JP | 2019155418 | 9/2019 |
| WO | 2005/042199 | 5/2005 |
| WO | 2005/056228 | 6/2005 |

OTHER PUBLICATIONS

Int'l Written Opinion (Form PCT/ISA/237) conducted in Int'l Appln. No. PCT/EP2021/085815 (May 12, 2022).

Japan Search Report (SR) conducted in counterpart Japan Appln. No.2023-536923 (Oct. 9, 2024).

Japan Office Action (OA) conducted in counterpart Japan Appln. No.2023-536923 (Oct. 2, 2024).

China Search Report and Office Action conducted in counterpart China Appln. No. 202180083861.9 (Nov. 13, 2025).

* cited by examiner

MULTIPLE WELDING METHOD

The invention relates to a method for carrying out a multiple welding method with at least two consumable electrodes on a parent material, a welding process being carried out at each electrode after an arc is ignited between the electrode and the parent material, and the welding processes of the at least two electrodes being synchronized in time. The invention also relates to an apparatus for carrying out a multiple welding method.

Gas metal arc welding (GMAW) methods have been known in the prior art for many years. These include, for example, the metal inert gas (MIG) welding method or the metal active gas (MAG) welding method, in which a consumable electrode made of a metal electrode material is surrounded by a shielding gas. Gas metal arc welding methods are usually used either to apply a weld seam to a parent material (build-up welding) or to join two parent materials (joint welding). In both cases, an arc is ignited between the electrode and the parent material by means of an electric welding voltage or a welding current resulting therefrom, which arc fuses the electrode and the region of the parent material surrounding the electrode, creating an integral bond. The same or a similar material as for the parent material is usually used as the electrode material. The electrode is fed to the welding point at a specific feed rate; the feed rate can be fixed, e.g., in manual welding by hand or by setting on the welding tool, or can also be dependent on other parameters, for example on a welding speed at which the electrode is moved relative to the parent material or depending on the current, etc.

In order to improve the welding performance, multiple welding methods are also known, in which welding is carried out with at least two electrodes simultaneously, with a separate welding process being carried out in each case. These include, for example, what is known as the tandem pulse welding method in which two pulse welding processes are carried out simultaneously. In this method, at least two electrodes in the form of welding wires are consumed into a common weld pool or each consumed into a separate weld pool. For this purpose, a separate welding tool is usually used for each pulse welding process, i.e., in each case a current source, a welding torch, a control unit and optionally a welding-wire feed unit. By means of each welding tool, a pulse welding process is realized by virtue of the control unit in each case controlling or regulating the welding parameters accordingly, i.e., in particular the welding current, the welding voltage, the wire feed and optionally the amount of shielding gas. In order to prevent any negative mutual influence of the simultaneously running pulse welding processes—which may reduce the welding quality—allowing the two pulse welding processes to be synchronized in time is also known. In the case of a welding tool, for example, a pulse frequency is specified which is followed by the other welding tool. The two welding processes are thus synchronized with one another and welding is carried out with the same pulse frequency so that a stable droplet detachment is set at both electrodes. Tandem welding methods with synchronized welding processes are disclosed, for example, in DE 11 2014 001 441 T5 and U.S. Pat. No. 8,946,596 B2.

In single welding methods, in which welding is carried out with only one consumable electrode, the so-called CMT mix welding process has been known for some time, as disclosed, for example, in EP 1 677 940 B1. In this process, a short-circuit welding phase having relatively low heat input into the parent material, and in which the welding wire moves in reverse, alternates with a pulse welding phase having a higher heat input relative thereto. The advantage of this method compared to conventional methods (e.g., pure pulse welding) is that the regulated current supply and the supporting effect of the wire movement during the material transfer result in only a very low heat input to the parent material. The CMT mix method is therefore used, inter alia, for mixed metal connections, for example for the connection of steel and aluminum. Until now, however, because of the potential occurrence of unstable welding processes, no multiple welding method has been disclosed in which a CMT mix welding process can be carried out at both electrodes.

It is therefore an object of the invention to provide a multiple welding method which enables stable welding processes at the electrodes and a lower heat input into the parent material compared to the multiple pulse welding method.

According to the invention, this object is achieved in that a welding process having a short-circuit welding phase and a hot-welding phase which has a higher heat input into the parent material relative to the short-circuit welding phase is carried out at the at least two electrodes, the short-circuit welding phase and the hot-welding phase alternating periodically and at least the short-circuit welding phases of the welding processes of the at least two electrodes being synchronized in time on the basis of at least one defined first synchronization event per short-circuit welding phase. As a result, the short-circuit welding phases of the multiple welding method carried out at the electrodes are in a defined temporal relationship with respect to one another, as a result of which a mutual negative influence on the welding processes can be avoided.

Preferably, the short-circuit welding phases are synchronized in time by providing a first phase shift between the first synchronization events, it being possible, for example, for a point in time at which a short circuit is formed in the short-circuit welding phase or a point in time at which a feed rate is increased to form a short circuit to be used as the first synchronization event. In this way, a fixed temporal relationship between the short-circuit welding phases can be set in a simple manner, and the phase shift can be determined, for example, in the form of a phase angle or a phase time.

In the short-circuit welding phase, at least one short-circuit cycle is preferably carried out in which the relevant electrode is moved towards the parent material until a short circuit is formed and, after the short circuit is formed, is moved away from the parent material in the opposite direction, with preferably two to ten short-circuit cycles being carried out in the short-circuit welding phase. The reversing wire feed can improve the detachment of the droplet from the electrode. By setting the number of short-circuit cycles, the heat input into the parent material can be varied.

Preferably, a spray arc welding phase having a constant welding current is used as the hot-welding phase, or a pulse welding phase having multiple pulse cycles which follow one another with a pulse frequency is carried out, in each of which cycles a base current phase having a base current alternates with a pulse current phase having a pulse current that is higher relative to the base current. When using a pulse welding phase, the known CMT mix welding process can thus advantageously be carried out at the electrodes of the multiple welding method.

It is advantageous if the pulse welding phases of the welding processes of the at least two electrodes are synchronized in time on the basis of at least one defined second synchronization event per pulse welding phase. As a result, the pulse welding phases are also in a defined temporal relationship with respect to one another and a CMT mix welding process can be carried out at each of the two (or more) electrodes of the multiple welding method without the two (or more) welding processes negatively influencing one another.

The pulse welding phases are preferably synchronized in time by providing a second phase shift between the second synchronization events, with a characteristic point in time in the pulse welding phase preferably being used as the second synchronization event, for example a point in time of a change in a welding parameter or a point in time of a droplet detachment from the electrode. As a result, the defined temporal relationship can be determined in a simple manner.

The object is further achieved by means of an apparatus mentioned at the outset in that the control units are designed to each carry out a welding process having a short-circuit welding phase and a hot-welding phase with a higher heat input into the parent material relative to the short-circuit welding phase, which alternate periodically, and at least the control unit of a first welding tool is designed to transmit at least one piece of synchronization information about a defined first synchronization event of the short-circuit welding phase of the welding process carried out with the first welding tool via the communication link to the control unit of the at least one second welding tool, the control unit of the at least one second welding tool being designed to synchronize the welding process carried out with the second welding tool in time with the welding process of the first welding tool by means of the obtained synchronization information on the basis of a defined first synchronization event of the short-circuit welding phase of the welding process carried out with the second welding tool.

Advantageous embodiments of the apparatus are specified in dependent claims 10 to 15.

The present invention is described in greater detail below with reference to FIGS. 1 to 5, which show schematic and non-limiting advantageous embodiments of the invention by way of example. In the figures.

Figure 1:
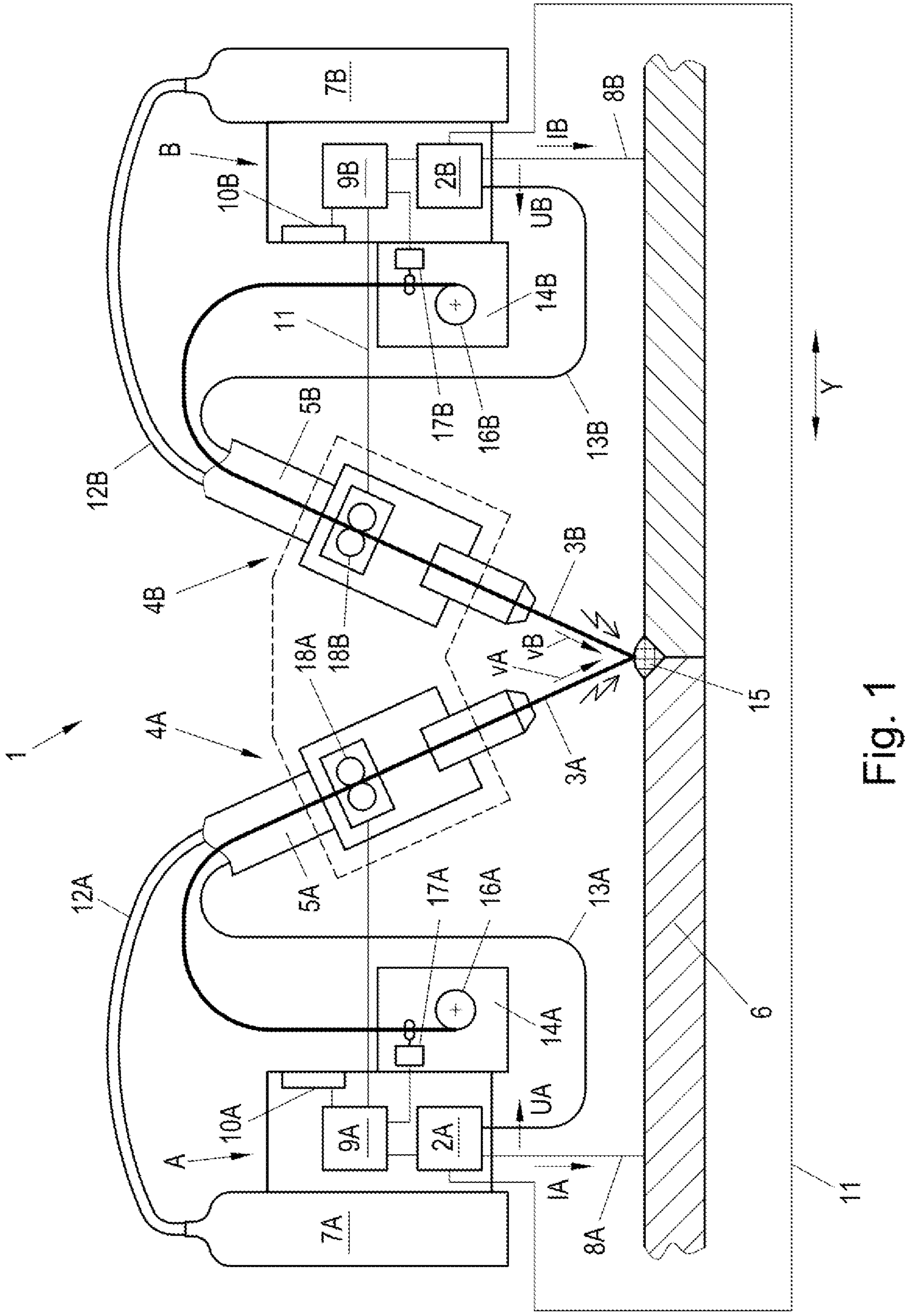
FIG. 1 shows a design of an apparatus for carrying out a multiple welding method.

FIG. 1 is a schematic representation of an apparatus 1 for carrying out a multiple welding method with at least two consumable electrodes 3A, 3B (e.g., MIG/MAG welding). The apparatus 1 here has two mutually independent welding tools A, B, each of which can be used to carry out a specific welding process on a common workpiece 6 made of a metal parent material 6. Of course, more than two welding tools A, B could also be provided, but the arrangement of two welding tools A, B is sufficient for understanding the invention. The welding tools A, B do not necessarily have to be designed as separate units, but it would also be conceivable for the two (or more) welding tools A, B to be arranged, for example, in a common housing. However, this does not change the fact that each welding tool A, B forms its own welding current circuit for carrying out the particular welding process.

As is known, the welding tools A, B each have a welding current source 2A, 2B, a welding-wire feed unit 14A, 14B and a welding torch 4A, 4B (MIG/MAG welding tools). The welding current sources 2A, 2B each provide the required welding voltage UA, UB, which are each applied to a welding wire as the consumable electrode 3A, 3B. The welding wire is fed to the relevant welding torch 4A, 4B by means of the welding-wire feed unit 14A, 14B at a specific feed rate vA, vB predefined by the particular welding process. The supply can take place, for example, within a hose pack 5A, 5B or also outside thereof. The welding-wire feed unit 14A, 14B can in each case be integrated in the welding tool A, B, but can also be a separate unit, as shown in FIG. 1. Inside the welding-wire feed unit 14A, 14B, for example, a wire roll 16A, 16B can be provided on which the welding wire is wound. The welding wire could, for example, also be arranged in a container such as a barrel and fed from there to the welding torch 4A, 4B. Furthermore, a suitable drive unit 17A, 17B can be provided, which is controlled by the control unit 9A, 9B in order to unwind the welding wire from the wire roll 16A, 16B or from the container and supply said wire to the welding torch 4A, 4B at a welding-wire feed rate vA, vB.

In addition, a suitable drive unit 18A. 18B can also be provided in the welding torch 4A, 4B for generating a feed rate vA, vB which can likewise be controlled by the corresponding control unit 9A, 9B. In general, the drive units 17A, 17B; 18A, 18B can be designed, for example, as driven roller pairs, between which the welding wire is conveyed. If the welding tool A, B has only one drive unit 17A, 17B outside the welding torch, it is also referred to a "push system." In such a system, the welding wire is pushed substantially toward the welding torch 4A, 4B. If the drive unit 18A, 18B shown is additionally provided in the welding torch 4A, 4B, it is also referred to as a "push-pull system." In such a system, the welding wire can be both pushed by the drive unit 17A, 17B toward the welding torch 4A, 4B and pulled by the drive unit 18A, 18B toward the welding torch 4A, 4B.

A "push-pull system" is used in particular in welding processes in which the feed rate vA, vB and optionally also the feed direction can change relatively quickly, for example in the case of a CMT welding process. In "push-pull systems," a suitable wire buffer, for example in the form of a known wire storage unit, may also be provided. The wire buffer can be arranged between the (push) drive unit 17A, 17B located outside the welding torch 4A, 4B and the (pull) drive unit 18A, 18B provided in the welding torch 4A, 4B.

To carry out a welding process, an arc is ignited between each electrode 3A, 3B, or the welding wire, and the parent material 6 (=workpiece), as is symbolized here by the lightning bolts. The material of the parent material 6 is consumed locally by the arc and what is known as a weld pool 15 is produced. Furthermore, the welding wire is fed to the weld pool 15 by means of a specific feed rate vA, vB and is consumed by the arc in order to apply the material of the consumable electrodes 3A, 3B to the workpiece 6. When the welding torches 4A, 4B move relative to the workpiece 6, a weld seam can thereby be formed (in FIG. 1 in the direction normal to the plane of the drawing).

In the respective hose pack 5A, 5B, further lines can optionally also be provided between the welding device A, B and the respective welding torch 4A, 4B (for example a control line (not shown) or a coolant line). A shielding gas may also be used in order to shield the weld pool 15 from the ambient air, in particular the oxygen contained therein, in order to avoid oxidation. Generally, inert gases (e.g., argon), active gases (e.g., $CO_2$) or mixtures thereof are used, and can also be supplied to the welding torch 4A, 4B via the hose pack 5A, 5B by means of suitable shielding gas lines 12A, 12B. The shielding gases are usually stored in separate (pressure) containers 7A, 7B, which can be supplied to the welding devices A, B (or directly to the welding torch 4A, 4B) via suitable lines, for example. If the same shielding gas is used, a common container for both (all) welding tools A. B could also be provided. The hose pack 5A, 5B can be coupled to the welding torch 4A, 4B and to the welding device A, B, for example via suitable couplings.

In order to form a welding current circuit for each of the welding tools A, B, the welding current sources 2A, 2B can each be connected to the parent material 6 by a ground line 8A, 8B. One pole of the welding current source 2A, 28, usually the negative pole, is connected to the ground line 8A, 8B. The other pole of the welding current source 2A, 2B, usually the positive pole, is connected to the welding electrode 4A, 4B (or vice versa) via a suitable current line 13A, 13B. A welding current circuit is thus formed for each welding process via the arc and the parent material 6.

A control unit 9A, 9B can also be provided in each of the welding tools A, B, which controls and monitors the welding process in each case, including the feeding of each welding wire. For this purpose, the welding parameters required for the welding process, such as the feed rate vA, vB, the welding current IA, IB, the welding voltage UA, UB, the pulse frequency fA, fB, etc., are predefined or can be adjusted in the control unit 9A, 9B. To control the relevant welding process, the control unit 9A, 9B is connected to the welding current source 2A, 2B and the welding-wire feed unit 14A, 148 (for example in particular the drive unit 17A, 178). A user interface 10A, 10B connected to the control unit 9A, 9B can also be provided for entering or displaying certain welding parameters or a welding status.

Furthermore, a suitable interface (not shown) could also be provided on the welding tool A, B and via which the welding tool A, B can be connected to a higher-level control unit by means of which the multiple welding method can be controlled. For example, a central control unit (not shown) could be provided that is connected to both welding devices A, B (or multiple welding devices) and via which the welding processes of the welding devices A, B can be controlled. The described welding tools A, B are of course well known, and for this reason will not be discussed in more detail at this point.

The two welding torches 4A, 4B can also be arranged locally relative to one another in such a way that the electrodes or welding wires 3A, 3B work in two separate weld pools instead of in a common weld pool 15 on the workpiece 6, as shown in FIG. 1. This arrangement with respect to one another can be fixed, for example in that both welding torches 4A, 4B are arranged on a welding robot (not shown) that guides both welding torches 4A, 4B. The arrangement can, however, also be variable, for example in that one welding torch 4A, 4B each is guided by a welding robot. Instead of a welding robot, another suitable manipulation apparatus can of course also be provided, for example a type of gantry crane, which preferably allows movement in multiple axes, preferably three. However, a common welding torch could also be provided for both electrodes 3A, 3B, as indicated by dashed lines in FIG. 1. It is irrelevant whether the welding torches 4A, 4B are used for joint welding or build-up welding or some other welding method. Of course, it would also be possible to carry out the multiple welding method manually, for example by guiding the welding torch or the welding torches 4A, 48 by hand.

The control units 9A, 9B of the welding tools A, B can be connected by means of a communication link 11, via which synchronization information Y can be transmitted and/or received, which allows the two welding processes to be synchronized in time. The welding tools A, B are preferably designed such that the synchronization information Y can be mutually exchanged between the control units 9A, 9B, as indicated in FIG. 1 by the double arrow. This allows the two welding tools A, B to be used both as the "lead" and the "trail." The "lead" welding tool A or B can transmit a synchronization information Y and the "trail" welding tool A or B can use the synchronization information Y to synchronize the welding process carried out with the "trail" welding tool A or B in time with the welding process of the "lead" welding tool A or B. The communication link 11 can be, for example, a wired or wireless connection between the control units 9A, 9B or between the user interfaces 10A, 10B, e.g., a well-known data bus.

In the simplest case, the synchronization information Y can be, for example, a single synchronization pulse which is transmitted by a transmitting welding tool A or B via the communication link 11 to the at least one other (receiving) welding tool A or B. The synchronization pulse can be transmitted as a current or voltage pulse on a wired communication link 11 between the two welding tools A, B, for example. However, it is also possible to implement the communication link 11 as a data bus on which bus messages are sent. In this case, the synchronization pulse can be transmitted as a bus message, which can be done by means of wires (cable, optical fiber, etc.) or wirelessly (WiFi, Bluetooth, etc.). In the receiving welding tool A or B, each welding process carried out can be synchronized by means of the received synchronization pulse with the welding process of the transmitting welding tool A or B.

According to the invention, the control units 9A, 9B are designed to each carry out a welding process having a short-circuit welding phase SPA1, SPB1 and a hot-welding phase SPA2, SPB2 with a higher heat input into the parent material 6 relative to the short-circuit welding phase (see FIG. 2-FIG. 5), which alternate periodically. Furthermore, at least the control unit 9A of a first welding tool A is designed to transmit a synchronization information Y about a defined first synchronization event SEA1 of the short-circuit welding phase SPA1 of the welding process carried out with the first welding tool A (FIG. 2-FIG. 5) via the communication link 11 to the control unit 9B of the at least one second welding tool B. The control unit 9B of the at least one second welding tool B is designed to synchronize the welding process carried out with the second welding tool B in time with the welding process of the first welding tool A by means of the obtained synchronization information Y on the basis of a defined first synchronization event SEB1 of the short-circuit welding phase SPB1 of the welding process carried out with the second welding tool B (FIG. 2-FIG. 5). The first welding tool A thus acts as a "lead" welding tool and the second welding tool B as a "trail" welding tool.

For example, characteristic points in time in the short-circuit welding phase SPA1, SPB1 in each welding process carried out, which are known or can be detected extremely easily, can be used as first synchronization events SEA1, SEB1. For example, a rapid change, e.g., a rising or falling edge in the time curve, of a welding parameter, such as the welding current I, the welding voltage U or the feed rate v, can be used as the first synchronization event SEA1, SEB1. The synchronization information Y can contain, for example, a first phase shift $\varphi$1 between the first synchronization event SEA1 in the welding process of the first welding tool A and the first synchronization event SEB1 in the welding process of the second welding tool B. For example, an angle of 0-360° with respect to periodically recurring welding cycles or a time can be used as phase shift p, as will be explained in more detail below with reference to FIG. 2-5.

As is known, the short-circuit welding phase SPA1, SPB1 is characterized in that a short circuit is formed when the relevant electrode 3A, 3B touches the parent material 6. This point in time at which the short circuit is formed, which is characteristic for the short-circuit welding phase SPA1, SPB1, can therefore advantageously be provided as the first synchronization event SEA1, SEB1 of the short-circuit welding phase SPA1, SPB1. The point in time at which the short circuit is formed can be determined, for example, on the basis of the curve of the welding current I or the welding voltage U, as will be explained in more detail below with reference to FIG. 2-FIG. 5. Instead of the point in time at which the short circuit is actually formed, however, a known point in time at which the feed rate v is increased—which is done deliberately to trigger the formation of a short circuit in a substantially forced manner—can also be used as the first synchronization event SEA1, SEB1, for example. Alternatively, a known point in time at which the welding current IA, IB is reduced—which is done deliberately to trigger the formation of a short circuit in a substantially forced manner—could also be used as the first synchronization event SEA1, SEB1, for example. By deliberately reducing the welding current IA, IB, the arc energy of the arc can be reduced so that a short circuit is formed. The above-mentioned increase in the feed rate v and the above-mentioned reduction of the welding current IA, IB could take place, for example, with a temporal offset, it being possible for either the point in time at which the feed rate v is increased or the point in time at which the welding current IA, IB is reduced to be used as the first synchronization event SEA1, SEB1. However, the increase in the feed rate v and the reduction of the welding current IA, IB could also take place simultaneously, so that the common point in time can be used as the first synchronization event SEA1, SEB1.

In order to improve the droplet detachment in the short-circuit welding phase SPA1, SPB1, it can be advantageous if in the short-circuit welding phase SPA1, SPB1 at least one short-circuit cycle ZKA, ZKB is carried out, in which the electrode 3A, 3B is moved toward the parent material 6 until a short circuit is formed and, after the short circuit is formed, is moved away from the parent material 6 in the opposite direction. The movement can be brought about in a known manner by the welding-wire feed unit 14A, 14B being controlled by the relevant control unit 9A, 9B. The duration of the short-circuit welding phase SPA1, SPB1 (which has a lower heat input into the parent material 6 relative to the hot-welding phase) can be defined flexibly, for example by specifying a specific number of short-circuit cycles ZKA, ZKB, for example two to ten short-circuit cycles ZKA, ZKB per short-circuit welding phase SPA1, SPB1. Each short-circuit cycle ZKA, ZKB preferably involves a reversing wire feed, that is to say a movement toward the parent material 6 until a short circuit is formed, and a movement away from the parent material 6 after the short circuit has been formed. Of course, a reversing wire feed, that is to say a reversal of the direction of the feed rate vA, vB, is only optional. A short-circuit welding phase SPA1, SPB1 could also be carried out, for example, merely with a variable feed rate v, without changing the direction of movement of the welding wire.

A known pulse welding phase (FIG. 2-FIG. 5), for example, can be used as the hot-welding phase SPA2, SPB2. In this way, the two welding tools A, B can each be used in parallel with the CMT mix welding process mentioned at the outset, in which a short-circuit welding phase SPA1, SPB1 and a pulse welding phase SPA2, SPB2 alternate periodically. In the pulse welding phase, generally multiple pulse cycles ZPA, ZPB which follow one another with a specific pulse frequency fA, fB are carried out, in each of which cycles a base current phase having a base current IGA, IGB and a pulse current phase having a pulse current IPA, IPB that is higher relative to the base current IGA, IGB alternate. However, a known spray arc welding phase (not shown) having a substantially constant welding current IA, IB can also be used as the hot-welding phase SPA2, SPB2.

Preferably, the same welding process is carried out in parallel at both electrodes 3A, 38, in that the control units 9A, 9B of the two welding tools A, B adjust identical predefined or predefinable welding parameters (U, I, v), f, etc.). If, for example, a pulse welding phase is carried out with both welding tools A, B as the hot-welding phase SPA2, SPB2, it is advantageous for the same pulse frequency fA, fB to be used in both pulse welding phases. However, the pulse frequency fA, fB in the pulse welding phase of one welding tool A, B could also be an integer multiple of the pulse frequency fA, fB of the pulse welding phase of the other welding tool A, B.

If a pulse welding phase is provided as a hot-welding phase SPA2, SPB2 in each case (CMT mix welding process), it is advantageous for the welding processes carried out with the at least two welding tools A, B at the at least two electrodes 3A, 3B to be synchronized in time on the basis of at least one defined second synchronization event SEA2, SEB2 per pulse welding phase. As a result, it is possible for the at least two (CMT mix) welding processes carried out in parallel to be synchronized in time in such a way that both the two short-circuit welding phases and the two pulse welding phases are in a defined temporal relationship with one another, as will be explained in further detail below with reference to FIG. 2-FIG. 5.

The pulse welding phases SPA2, SPB2 can be synchronized in time, for example, in the same way as the short-circuit welding phases, by providing a second phase shift 92 between the defined second synchronization events SEA2, SEB2, for example in the form of a phase angle or a time. In turn, a characteristic point in time in the pulse welding phase SPA2, SPB2 can be used as the second synchronization event SEA2, SEB2, for example a point in time of a droplet detachment from the relevant electrode 3A, 3B or a point in time of a rapid change of a welding parameter, for example a rising or falling edge in the time curve, such as the welding current I, the welding voltage U or the feed rate v.

As a result of the temporal synchronization of the two (preferably CMT mix) welding processes according to the invention, it is now possible for the (at least) two welding processes to be able to be carried out in a stable manner and with the lowest possible mutual influence due to the fact that the processes run in a defined time ratio to one another. The respective points in time at which a short circuit is formed (or points in time at which the feed rate is increased to trigger a short circuit or points in time at which the welding current is reduced to trigger a short circuit) and/or points in time at which the droplet detaches can be detected, for example, by the relevant control unit 9A, 9B or can also be known, for example, when preset welding processes with known welding parameters (known time curve of the welding current I, the welding voltage U, the feed rate v, etc.) are used.

For example, the control unit 9A of the first welding tool A can carry out a first welding process by setting specific welding parameters, such as a specific welding current IA, a welding voltage UA and a specific feed rate vA by the control unit 9A (e.g., a predefined CMT mix welding process having a short-circuit welding phase SPA1 and having a pulse welding phase as the hot-welding phase SPA2). Analogously, the control unit 9B of the second welding tool B can carry out a second welding process by setting specific welding parameters, such as a specific welding current IB, a welding voltage UB and a specific feed rate vB by the control unit 9B (e.g., again a predefined CMT mix welding process having a short-circuit welding phase and having a pulse welding phase as the hot-welding phase SPB2).

The control unit 9A of the first welding tool A ("lead") can transmit a synchronization information Y about at least one first synchronization event SEA1 of the short-circuit welding phase SPA1 of the first welding process (e.g., a point in time at which a short circuit is formed) and (optionally) information about at least one second synchronization event SEA2 of the pulse welding phase SPA2 of the first welding process (e.g., a point in time of a droplet detachment from the electrode 3A) via the communication link 11 to the control unit 9B of the second welding tool B, for example as a synchronization pulse or as a bus message. The control unit 9B of the second welding tool B ("trail") can use the obtained synchronization information Y to synchronize the carried out second (CMT mix) welding process in time with the first (CMT) welding process of the first welding tool A. In particular, the control unit 9B of the second welding tool B can synchronize the short-circuit welding phase SPB1 in time with the short-circuit welding phase SPA1 of the first welding tool A on the basis of a first synchronization event SEB1 (e.g., the point in time at which a short circuit is formed) by means of the synchronization information Y. In addition, the control unit 98 of the second welding tool B can synchronize the pulse welding phase SPB2 in time with the pulse welding phase SPA2 of the first welding tool A on the basis of a second synchronization event SEB2 (e.g., the point in time at which a droplet detaches from the electrode 3B) optionally by means of the synchronization information Y.

Figure 2:
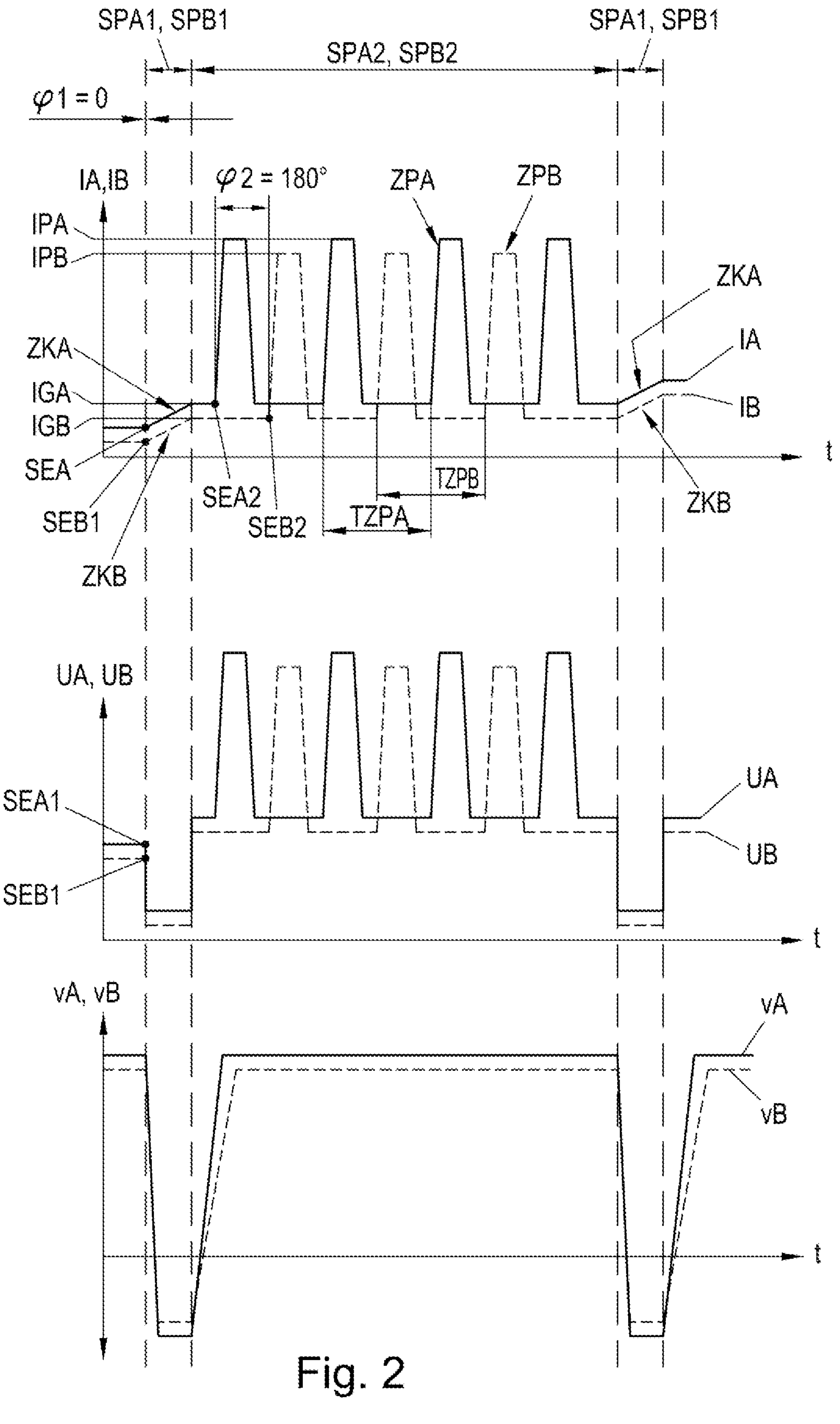
FIG. 2 shows a time curve of welding parameters of the multiple welding method according to a first advantageous embodiment of the invention.
Figure 3:
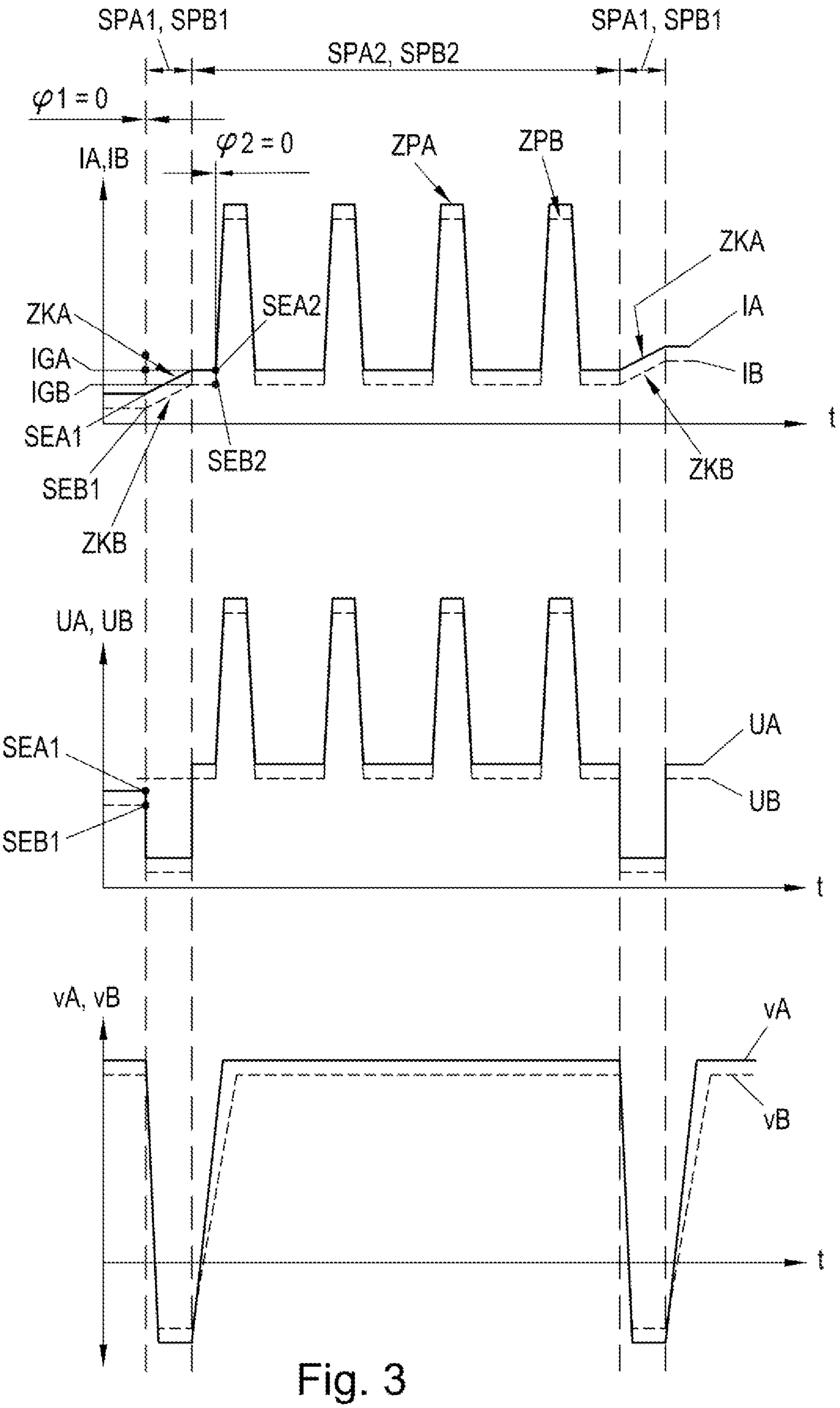
FIG. 3 shows a time curve of welding parameters of the multiple welding method according to a second advantageous embodiment of the invention.

For example, the synchronization information Y could contain a specific first phase shift φ1, by means of which the short-circuit welding phases SPA1, SPB1 are carried out with a temporal offset from one another. The first phase shift φ1 can be predefined, but could also be adjustable (e.g., via the user interface 10A and/or 10B). Analogously, the synchronization information Y could contain a specific second phase shift φ2, by means of which the pulse welding phases SPA2, SPB2 are carried out with a temporal offset from one another. It would be conceivable, for example, for the short-circuit welding phases SPA1, SPB1 to be carried out synchronously, that is to say with a first phase shift $\varphi1=0$, and for the pulse welding phases SPA2, SPB2 to also be carried out synchronously, that is to say with a second phase shift $\varphi2=0$, as shown in FIG. 3. However, a different temporal synchronization could of course be selected, for example $\varphi1=0$, $\varphi2\neq0$ (FIG. 2); $\varphi1\neq0$, $\varphi2=0$ (FIG. 5); $\varphi1=\varphi2\neq0$ (FIG. 4) where $\varphi1<\varphi2$, $\varphi1>\varphi2$ or $\varphi1=\varphi2$.

Advantageous embodiments of the synchronization according to the invention are described below with reference to FIG. 2 to FIG. 5. In these figures, for the welding processes carried out in parallel at the (in this case two) electrodes 3A, 3B, curves of the welding current IA, IB, the welding voltage UA, UB and the feed rate vA, vB over time t are shown on top of one another. The solid line relates to the first welding process carried out, for example, with the first welding tool A at the first electrode 3A and the dashed line relates to the second welding process of the multiple welding method carried out with the second welding tool B at the second electrode 3B. By way of example, two CMT mix welding processes are shown here as the first and second welding process, in each of which a short-circuit welding phase SPA1, SPB1 and a pulse welding phase hot-welding phase SPA2, SPB2 alternate periodically. The CMT mix welding process is known in principle in the case of the single welding method with one electrode, and therefore only the aspects essential to the invention will be discussed in more detail here. As mentioned, however, a spray arc welding phase having a substantially constant welding current IA, IB could also be used as the hot-welding phase instead of the pulse welding phase. In this case, a synchronization of the short-circuit welding phases SPA1, SPB1 would be sufficient.

As is known, multiple pulse cycles ZPA, ZPB which follow one another with a predefined or adjustable pulse frequency fPA, fPB can be carried out in the pulse welding phase SPA2, SPB2. The pulse frequency fPA, fPB in this case corresponds to the reciprocal of the period duration TZPA, TZPB of the pulse cycle ZPA, ZPB, as shown by way of example in FIG. 2 on the basis of a pulse cycle ZPA. ZPB of the second (pulse) welding phases SPA2, SPB2. In each pulse cycle ZPA, ZPB, it is typical for a base current phase having a base current IGA, IGB to alternate with a pulse current phase having a pulse current IPA, IPB that is higher relative to the base current IGA, IGB. Generating such a current pulse per pulse cycle ZPA, ZPB brings about a specific droplet detachment from each electrode 3A, 3B. The point in time at which the droplet detaches can be used, for example, for the pulse welding phase SPA2, SPB2 as a characteristic second synchronization event SEA2, SEB2 within the meaning of the invention in order to synchronize the two pulse welding phases SPA2, SPB2 with one another in time, as will be explained in more detail below.

The pulse frequencies fPA, fPB, base currents IGA, IGB and pulse currents IPA, IPB can be selected to be equal in size, but can also differ. The time curve of the welding voltage UA, UB, shown in the middle diagram in each case, corresponds qualitatively substantially to the curve of the welding current IA, IB, and for this reason it will not be discussed in more detail here. In general, the voltage U during the welding process results from the voltage drop at the arc and the voltage drop at the free wire end of the welding wire. The feed rate vA, vB of the electrodes 3A, 3B is substantially constant during the pulse welding phase SPA2, SPB2, as can be seen in the bottom diagram, and changes in each case at the transition from or into the short-circuit welding phase SPA1, SPB1. Of course, however, a non-constant feed rate vA, vB in the pulse welding phase SPA2, SPB2 would also be conceivable. The duration of the entire pulse welding phase SPA2, SPB2 (which results from the number of pulse cycles ZPA, ZPB and the period duration TZPA, TZPB thereof) can be set, for example, by specifying a time or by specifying the number of pulse cycles ZPA, ZPB and the period duration TZPA, TZPB thereof.

In the examples shown in FIG. 2-FIG. 5, the welding current IB, the welding voltage UB and the feed rate vB of the second electrode 3B are somewhat lower in terms of magnitude than the welding current IA, the welding voltage UA and the feed rate vA of the first electrode 3A. This is due to the fact that the first electrode 3A is defined here as the lead electrode and the second electrode 3B is defined as the trail electrode. The lead electrode precedes the trail electrode in the welding direction (=direction of movement of the welding torches 4A, 4B for producing the weld seam). This means that the trail electrode operates in the weld pool already produced by the lead electrode, which is why a slightly lower amount of welding energy is required. Of course, this is only by way of example, and identical welding parameters could also be used in both welding processes.

In the short-circuit welding phase SPA1, SPB2, it is known that at least one short-circuit cycle ZKA, ZKB is carried out in which the relevant electrode 3A, 3B is moved toward the parent material until a short circuit is formed and, preferably after the short circuit is formed, is moved back away from the parent material 6 in the opposite direction, as can be seen in the bottom diagram with reference to the feed rate vA, vB. The time at which a short circuit is formed can be identified by an increase in the welding current IA, IB or in particular by a simultaneous drop in the welding voltage UA, UB. The time at which a short circuit is formed can advantageously be used within the meaning of the invention as a characteristic first synchronization event SEA1, SEB1 of the short-circuit welding phase SPA1, SPB1 in order to be able to synchronize the two short-circuit welding phases SPA1, SPB1 with one another in time, as will be explained below. Alternatively, however, instead of using the point in time at which the short circuit is actually formed as the characteristic first synchronization event SEA1, SEB1 of the short-circuit welding phase SPA1, SPB1, it is also possible, for example, to use a point in time at which the feed rate vA, vB increases briefly (shown by way of example in FIG. 5), which is deliberately brought about shortly before the point in time at which the short circuit is formed in order to trigger the formation of the short circuit.

In the examples shown, only a single short-circuit cycle ZKA, ZKB per short-circuit welding phase SPA1, SPB1 is shown, but of course multiple short-circuit cycles ZKA, ZKB could also be carried out. For example, two to ten short-circuit cycles ZKA, ZKB can be carried out per short-circuit welding phase SPA1, SPB1. By specifying the number of short-circuit cycles ZKA, ZKB, the duration of the short-circuit welding phase SPA1, SPB1 can be defined, and thus the time in which a lower heat input into the parent material 6 (relative to the hot-welding phase SPA2, SPB2 or pulse welding phase) is to take place. In a short-circuit cycle ZKA, ZKB, the welding current IA, IB can also be changed, in particular, a specific curve of the welding current IA. IB can be regulated by the relevant control unit 9A, 9B. For example, during a short-circuit cycle ZKA, ZKB, the welding current IA, IB can be increased, in addition to the reversing wire feed speed vA, vB, from a base current (which can be the same as or different from the base current IGA, IGB of the pulse welding phase SPA2, SPB2) to a boost current that is higher relative to the base current (and lower relative to the pulse current IPA, IPB of the pulse welding phase SPA2, SPB2) and reduced again to the base current in order to assist the droplet detachment.

In the example according to FIG. 2, the short-circuit welding phases SPA1, SPB1 are synchronized in time with a first phase shift φ1=0, i.e., the short-circuit cycles ZKA, ZKB of the two welding processes carried out in parallel at the electrodes 3A, 3B are carried out at the same time. The synchronization takes place as already described on the basis of at least one first synchronization event SEA1, SEB1 per short-circuit welding phase SPA1, SPB1, with the point in time at which a short circuit is formed in the short-circuit cycles ZKA, ZKB being provided as the first synchronization event SEA1, SEB1. In the example shown, the pulse welding phases SPA2, SPB2 are synchronized in time with a second phase shift φ2=180°, that is to say, the pulse cycles ZPA, ZPB are carried out with a temporal offset from one another, as can be seen on the basis of the welding current IA, IB and on the basis of the welding voltage UA, UB. The synchronization of the pulse welding phases SPA2, SPB2 is again carried out on the basis of at least one second synchronization event SEA2, SEB2 per pulse welding phase SPA2, SPB2, with the point in time at which the droplet detaches, that is, the rise from the base current IGA, IGB to the pulse current IPA, IPB, being provided as the second synchronization event SEA2, SEB2. The pulse frequencies fA, fB are preferably equal, as can be seen in FIG. 2. However, the pulse frequencies could also be of different magnitudes, with the higher pulse frequency fA, fB preferably being an integer multiple of the lower pulse frequency fA, fB in each case.

In the example according to FIG. 3, the short-circuit welding phases SPA1, SPB1 are synchronized in time with a phase shift φ1=0, and the pulse welding phases SPA2, SPB2 are also synchronized in time with a phase shift φ2=0°, i.e., the short-circuit cycles ZKA, ZKB and the pulse cycles ZPA, ZPB are carried out synchronously, as can be seen on the basis of the welding current IA, IB and on the basis of the welding voltage UA, UB. The synchronization again takes place analogously on the basis of the points in time at which a short circuit is formed as first synchronization events SEA1, SEB1 of the short-circuit welding phases SPA1, SPB1 and on the basis of the droplet detachment as second synchronization events SEA2, SEB2 of the pulse welding phases SPA2, SPB2.

Figure 4:
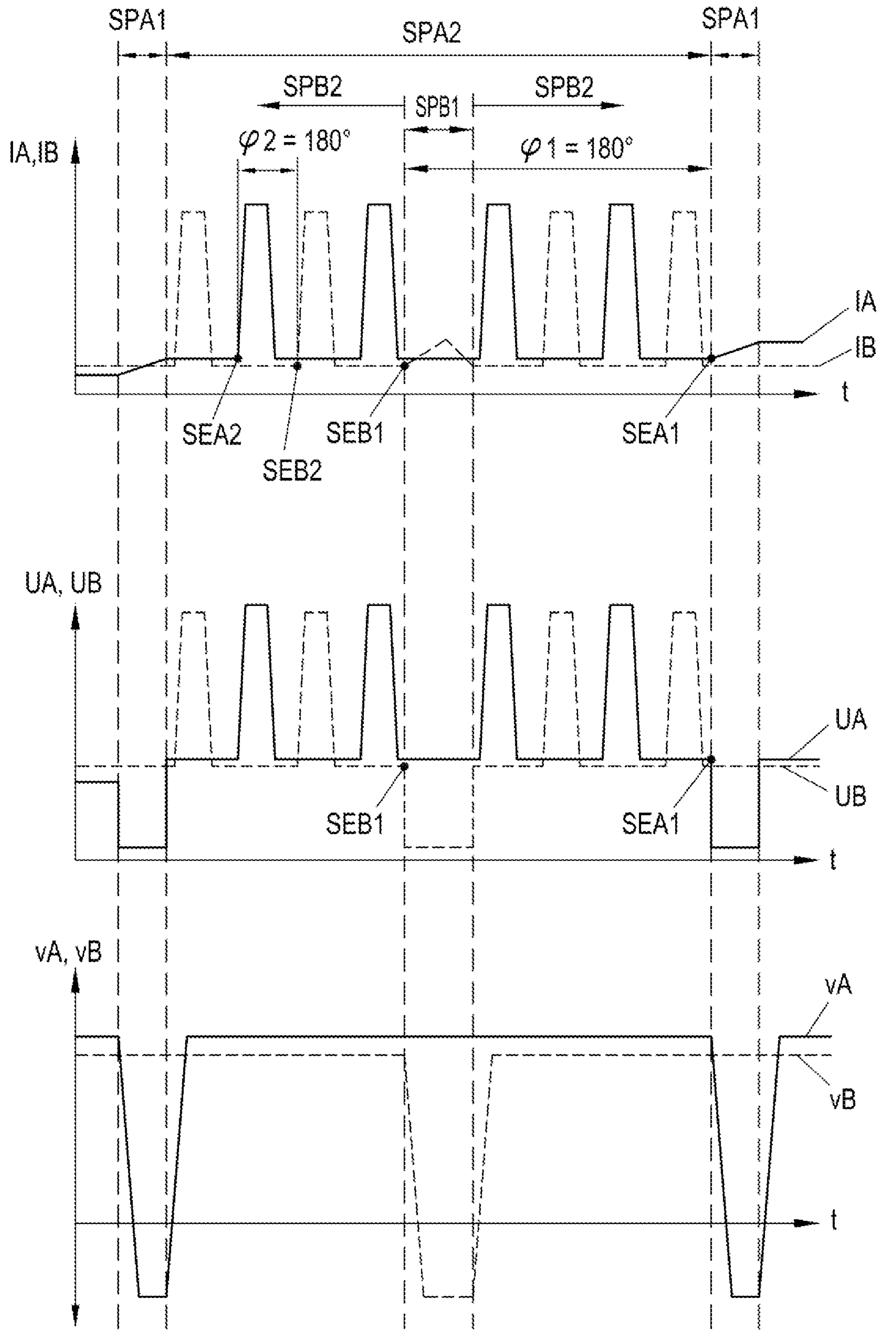
FIG. 4 shows a time curve of welding parameters of the multiple welding method according to a third advantageous embodiment of the invention.
Figure 5:
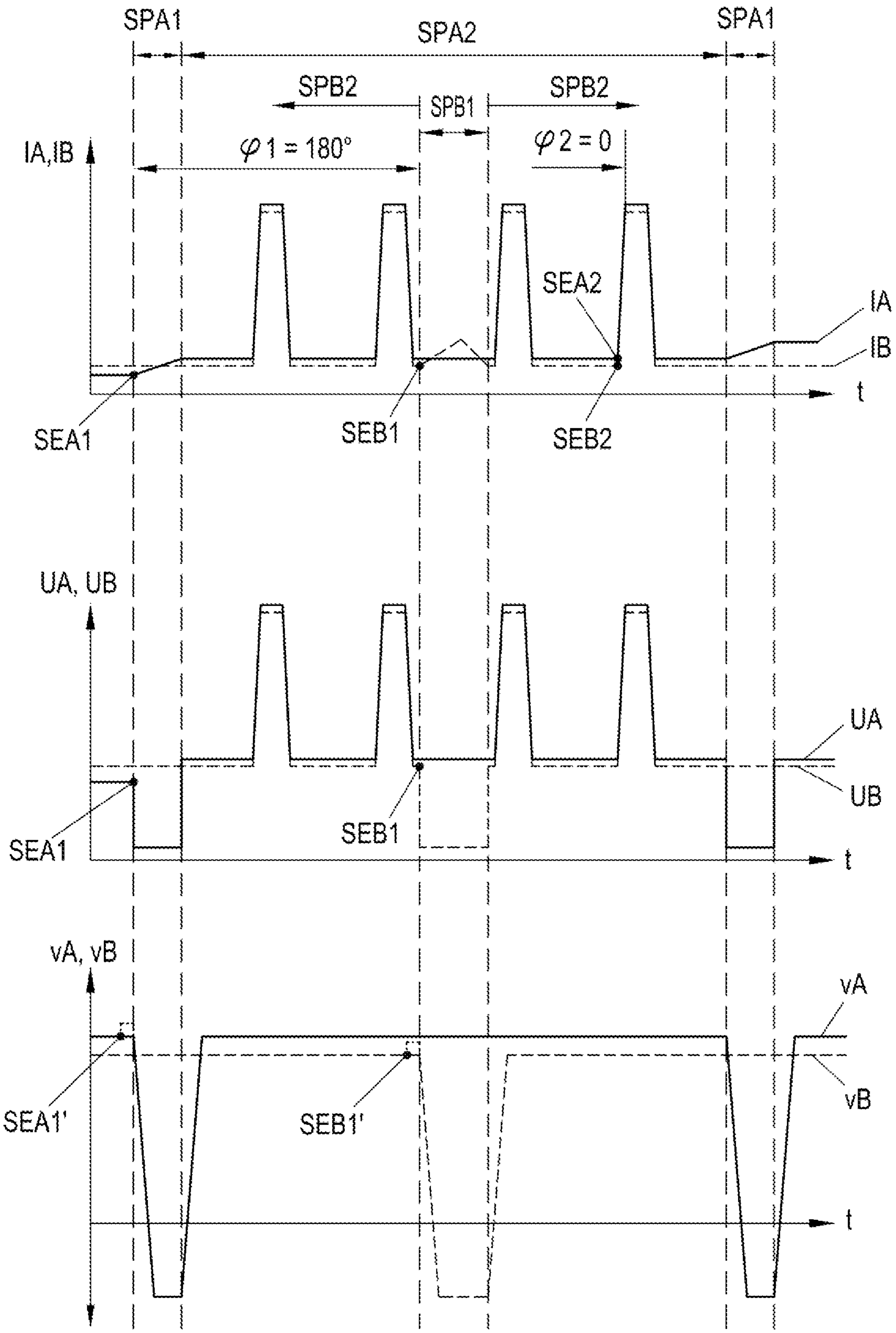
FIG. 5 shows a time curve of welding parameters of the multiple welding method according to a fourth advantageous embodiment of the invention.

In the example according to FIG. 4, the short-circuit welding phases SPA1, SPB1 are synchronized in time with a phase shift φ1=180° and the pulse welding phases SPA2, SPB2 are also synchronized in time with a phase shift φ2=180°. This means that the short-circuit cycles ZKA, ZKB and the pulse cycles ZPA, ZPB are carried out with a temporal offset, as can be seen on the basis of the welding current IA, IB, on the basis of the welding voltage UA, UB and for the short-circuit welding phases SPA1, SPB1 also on the basis of the feed rate vA, vB. The synchronization again takes place on the basis of the points in time at which a short circuit is formed as first synchronization events SEA1, SEB1 of the short-circuit welding phases SPA1, SPB1 and on the basis of the droplet detachment as second synchronization events SEA2, SEB2 of the pulse welding phases SPA2, SPB2. Of course, other characteristic points in time could also be provided as first synchronization events SEA1, SEB1 and second synchronization events SEA2, SEB2.

Finally, in the example according to FIG. 5, the short-circuit welding phases SPA1, SPB1 are synchronized in time with a phase shift φ1=180° and the pulse welding phases SPA2, SPB2 are synchronized in time with a phase shift φ2=0°. This means that the short-circuit cycles ZKA, ZKB are carried out with a temporal offset and the pulse cycles ZPA, ZPB are carried out synchronously, as can be seen on the basis of the welding current IA, IB, on the basis of the welding voltage UA, UB and for the short-circuit welding phases SPA1, SPB1 also on the basis of the feed rate vA, vB. The synchronization again takes place on the basis of the points in time at which a short circuit is formed as first synchronization events SEA1, SEB1 of the short-circuit welding phases SPA1, SPB1 and on the basis of the droplet detachment as second synchronization events SEA2, SEB2 of the pulse welding phases SPA2, SPB2.

For the sake of completeness, the above-mentioned brief increase in the feed rate vA, vB is also shown in the bottom diagram in FIG. 5 as an alternative synchronization event SEA1', SEB1' of the short-circuit welding phases SPA1, SPB1 (dotted line). In this case, the feed rate vA, vB is deliberately increased briefly at a defined time in order to trigger the formation of a short circuit. The increase in the wire feed speed is shown to be abrupt in FIG. 5. Of course, however, the wire feed speed can also increase steadily. Because the welding process carried out is known and the time curves of the welding parameters are known, the point in time is of course also known.

By means of the temporal synchronization according to the invention, the welding processes of the multiple welding method carried out in parallel can be coordinated with one another in a desired manner, so that the two (or more) welding processes negatively influence one another as little as possible. Lastly, it should be mentioned that the described embodiments are of course only exemplary and do not limit the invention and that the specific embodiment is at the discretion of a person skilled in the art.

The invention claimed is:

1. A method for carrying out a multiple welding method with at least two consumable electrodes on a parent material, a welding process being carried out at each electrode after an arc is ignited between the electrode and the parent material, and the welding processes of the at least two electrodes being synchronized in time, comprising:

carrying out a welding process having a short-circuit welding phase and a hot-welding phase, in which the hot-welding phase has a higher heat input into the parent material relative to the short-circuit welding phase, at the at least two electrodes, the short-circuit welding phase and the hot-welding phase alternating periodically, and synchronizing in time at least the short-circuit welding phases of the welding processes of the at least two electrodes with each other on a basis of at least one defined first synchronization event per short-circuit welding phase.

2. The method according to claim 1, wherein the short-circuit welding phases are synchronized in time by providing a first phase shift between the first synchronization events.

3. The method according to claim 1, further comprising using a point in time at which a short circuit is formed in the short-circuit welding phase or a point in time at which a feed rate is increased to form a short circuit or a point in time at which a welding current is reduced to form a short circuit as the first synchronization event.

4. The method according to claim 1, further comprising carrying out at least one short-circuit cycle in the short-circuit welding phase, in which a relevant electrode is moved towards the parent material until a short circuit is formed and, after the short circuit is formed, moving the relevant electrode in an opposite direction away from the parent material.

5. The method according to claim 1, wherein a pulse welding phase or a spray arc welding phase is used as the hot-welding phase, multiple pulse cycles which follow one another with a pulse frequency being carried out in the pulse welding phase, in each of which cycles a base current phase having a base current and a pulse current phase having a pulse current that is higher relative to the base current alternate, and a constant welding current is used in the spray arc welding phase.

6. The method according to claim 5, wherein the pulse welding phases of the welding processes of the at least two electrodes are synchronized in time on a basis of at least one defined second synchronization event per pulse welding phase.

7. The method according to claim 6, wherein the pulse welding phases are synchronized in time by providing a second phase shift between the second synchronization events.

8. The method according to claim 6, wherein a characteristic point in time in the pulse welding phase is used as the second synchronization event.

9. An apparatus for carrying out a multiple welding method, comprising:

at least two welding tools for carrying out a welding process with a consumable electrode on a parent material, wherein each welding tool has a control unit for controlling the welding process, and the control units of the at least two welding tools are connected with each other via a communication link in order to synchronize the welding processes in time, wherein the control units are designed to each carry out a welding process having a short-circuit welding phase and a hot-welding phase that alternate periodically, the hot-welding phase having a higher heat input into the parent material relative to the short-circuit welding phase, and wherein at least the control unit of a first welding tool is designed to transmit at least one piece of synchronization information about a defined first synchronization event of the short-circuit welding phase of the welding process carried out with the first welding tool via the communication link to the control unit of at least a second welding tool, the control unit of the at least second welding tool being designed to synchronize the welding process carried out with the second welding tool in time with the welding process of the first welding tool based on obtained synchronization information of a defined first synchronization event of the short-circuit welding phase of the welding process carried out with the second welding tool.

10. The apparatus according to claim 9, wherein the synchronization information contains at least one first phase shift between the first synchronization events.

11. The apparatus according to claim 9, wherein a point in time at which a short circuit is formed in the short-circuit welding phase or a point in time at which a feed rate is increased to form a short circuit or a point in time at which a welding current is reduced to form a short circuit is used as the first synchronization event.

12. The apparatus according to claim 11, wherein each welding tool has a welding-wire feed unit controllable by the control unit, the control unit being designed to carry out in the short-circuit welding phase at least one short-circuit cycle, in which the welding-wire feed unit moves the electrode towards the parent material until a short circuit is formed and, after the short circuit is formed, moves the electrode in an opposite direction away from the parent material.

13. The apparatus according to claim 11, wherein the control units are designed to carry out, as the hot-welding phase, a pulse welding phase having multiple pulse cycles which follow one another with a pulse frequency, in each of which cycles a base current phase having a base current and a pulse current phase having a pulse current that is higher relative to the base current alternate, or wherein the control units are designed to carry out a spray arc welding phase having a constant welding current as the hot-welding phase.

14. The apparatus according to claim 10, wherein at least the control unit of the first welding tool is designed to transmit a synchronization information about a defined second synchronization event of the pulse welding phase of the welding process carried out with the first welding tool via the communication link to the control unit of the at least one second welding tool, the control unit of the at least one second welding tool being designed to synchronize the welding process carried out with the second welding tool in time with the welding process of the first welding tool by the obtained synchronization information on a basis of a defined second synchronization event of the pulse welding phase of the welding process carried out with the second welding tool.

15. The apparatus according to claim 14, wherein the synchronization information contains at least one phase shift between the second synchronization events.

16. The method according to claim 4, wherein, after the short circuit is formed, the relevant electrode is moved away from the parent material in the opposite direction, with two to ten short-circuit cycles being carried out in the short-circuit welding phase.

17. The method according to claim 8, wherein the characteristic point in time in the pulse welding phase used as the second synchronization event is a point in time of a change in a welding parameter or a point in time of a droplet detachment from the electrode.

18. The apparatus according to claim 12, wherein, as the electrode moves away from the parent material in the opposite direction after the short circuit is formed, two to ten short-circuit cycles being carried out in the short-circuit welding phase.

19. The apparatus according to claim 15, wherein a characteristic point in time in the pulse welding phase is provided as the second synchronization event.

20. The apparatus according to claim 15, wherein the characteristic point in time in the pulse welding phase is a point in time of a droplet detachment from the electrode or a point in time of a change in a welding parameter.

* * * * *